United States Patent [19]
Owen et al.

[11] Patent Number: 6,028,635
[45] Date of Patent: Feb. 22, 2000

[54] REDUCING THE MEMORY REQUIRED FOR DECOMPRESSION BY STORING COMPRESSED INFORMATION USING DCT BASED TECHNIQUES

[75] Inventors: Jefferson Eugene Owen, Fremont; Jeyendran Balakrishnan, Sunnyvale, both of Calif.

[73] Assignee: STMicroelectronics, Inc., Carrollton, Tex.

[21] Appl. No.: 08/759,166

[22] Filed: Dec. 3, 1996

[51] Int. Cl.$^7$ .................. H04N 7/18; H04N 7/12; H04N 11/04
[52] U.S. Cl. .................. 348/403; 348/415; 348/416; 348/384; 348/699; 348/714; 348/715
[58] Field of Search .................. 382/232, 236, 382/235; 386/111; 348/416, 415, 426, 428, 431, 461, 463, 405, 406, 384, 411, 409, 699, 700, 714, 715, 721, 403

[56] References Cited

U.S. PATENT DOCUMENTS

| | | | |
|---|---|---|---|
| 4,328,557 | 5/1982 | Gastinel | 364/900 |
| 5,264,936 | 11/1993 | Meunier | 358/188 |
| 5,400,078 | 3/1995 | Maldonado et al. | 348/558 |
| 5,459,519 | 10/1995 | Scalise et al. | 348/431 |
| 5,473,377 | 12/1995 | Kim | 348/405 |
| 5,708,732 | 1/1998 | Merhav et al. | 382/232 |
| 5,717,461 | 2/1998 | Hoogenboom | 348/416 |
| 5,717,816 | 2/1998 | Boyce et al. | 386/111 |
| 5,724,446 | 3/1998 | Liu et al. | 348/416 |
| 5,742,347 | 4/1998 | Kandlur et al. | 348/426 |
| 5,777,677 | 7/1998 | Linzer et al. | 348/397 |
| 5,796,434 | 8/1998 | Lempel | 348/403 |
| 5,825,419 | 10/1998 | Mishima et al. | 348/402 |
| 5,844,608 | 12/1998 | Yu et al. | 348/390 |
| 5,847,762 | 12/1998 | Canfield et al. | 348/415 |

FOREIGN PATENT DOCUMENTS

| | | |
|---|---|---|
| 0 577 418 A2 | 1/1994 | European Pat. Off. . |
| 0 673 171 A2 | 9/1995 | European Pat. Off. . |
| 0 682 454 A2 | 11/1995 | European Pat. Off. . |
| 0 696 874 A2 | 2/1996 | European Pat. Off. . |
| 0 697 794 A2 | 2/1996 | European Pat. Off. . |
| 44 08 522 A1 | 9/1994 | Germany . |

OTHER PUBLICATIONS

Rosemont, *Institute of Electrical and Electronics Engineers*, "An Integrated MPEG–1 and MPEG–2 Decoder," pp. 324–325, Jun. 21, 1994.

D.J. LeGall, *Signal Processing: Image Communication*, "The MPEG Video Compression Algorithm," pp. 137–139, vol. 4, No. 2, Apr. 1, 1992.

*Primary Examiner*—Anand S. Rao
*Attorney, Agent, or Firm*—David V. Carlson; Theodore E. Galanthay; Lisa K. Jorgenson

[57] ABSTRACT

A method of reducing the memory required for decompression of a compressed frame by storing frames in a compressed format using DCT compression and decoders for implementing such a method are disclosed. The decoder is coupled to a memory where the frame can be stored. The decoder includes a decoder module having a parser, a block decoder module and a motion compensation engine. The decoder module is coupled to a DCT encoder module, which has an output coupled to the memory. The decoder also includes a stored DCT decoder module, which has an input coupled to the memory, a first output coupled to the motion compensation module and a second output that functions as an output of the decoder. In operation, any prediction frames needed for motion compensation decompression of the compressed frame are decompressed in the stored DCT decoder module. The compressed frame is decompressed in the decoder module to obtain a decompressed frame. The decompressed frame is compressed in the DCT encoder module to obtain a recompressed frame. The recompressed frame is then stored in memory. In a DCT based decoder, this is only performed for frames having interpicture prediction errors, such as P and B frames. Frames that do not have interpicture prediction errors, such as I frames can by-pass most of the decoder module, and all of the DCT encoder module. The compressed frame can be stored in the memory without having been decompressed and recompressed.

30 Claims, 3 Drawing Sheets

REDUCING THE MEMORY REQUIRED FOR DECOMPRESSION BY STORING COMPRESSED INFORMATION USING DCT BASED TECHNIQUES

CROSS-REFERENCE TO RELATED APPLICATION

This application is a related to copending application, U.S. patent application Ser. No. 08/758,779, filed Dec. 3, 1996, entitled "Multi-Standard Decompression and/or Compression Device, now pending.

BACKGROUND

The present invention relates to the field of video decompression devices, and is more specifically directed to methods and circuits for reducing the memory required during decompression by storing compressed information using discrete cosine transform (DCT) based techniques.

The size of a digital representation of uncompressed video images depends on the resolution and color depth of the image. A movie composed of a sequence of uncompressed video images, and accompanying audio signals quickly becomes too large to fit entirely onto conventional recording medium, such as a compact disk (CD). Moreover, transmitting such an uncompressed movie over a communication link is prohibitively expensive because of the excessive quantity of data to be transmitted.

It is therefore advantageous to compress video and audio sequences before they are transmitted or stored. A great deal of effort is being expended to develop systems to compress these sequences. There are several coding standards currently used that are based on the DCT algorithm including MPEG-1, MPEG-2, H.261, and H.263. (MPEG is an acronyn for "Motion Picture Expert Group", a committee of the International Organization for Standardization, ISO.) The MPEG-1, MPEG-2, H.261 and H.263 standards include decompression protocols that describe how an encoded (i.e. compressed) bitstream is to be decoded (i.e. decompressed). The encoding can be done in any manner, as long as the resulting bitstream complies with the standard.

Video and/or audio compression devices (hereinafter encoders) are used to encode the video and/or audio sequence before the sequence is transmitted or stored. The resulting encoded bitstream is decoded by a video and/or audio decompression device (hereinafter decoder) before the video and/or audio sequence is output. However, a bitstream can only be decoded by a decoder if it complies with the standard used by the decoder. To be able to decode the bitstream on a large number of systems, it is advantageous to encode the video and/or audio sequences according to a well accepted encoding/decoding standard. The MPEG standards are currently well accepted standards for one way communication. H.261, and H.263 are currently well accepted standards for two way communication, such as video telephony.

Once decoded, the decoded video and audio sequences can be output on an electronic system dedicated to outputting video and audio, such as a television or a video cassette recorder (VCR) player, or on an electronic system where image display and audio is just one feature of the system, such as a computer. A decoder needs to be added to these electronic systems to allow them to decode the compressed bitstream into uncompressed data, before it can be output. An encoder needs to be added to allow such electronic systems to compress video and/or audio sequences that are to be transmitted or stored. Both the encoder and decoder need to be added for two way communication.

Figure 1A:
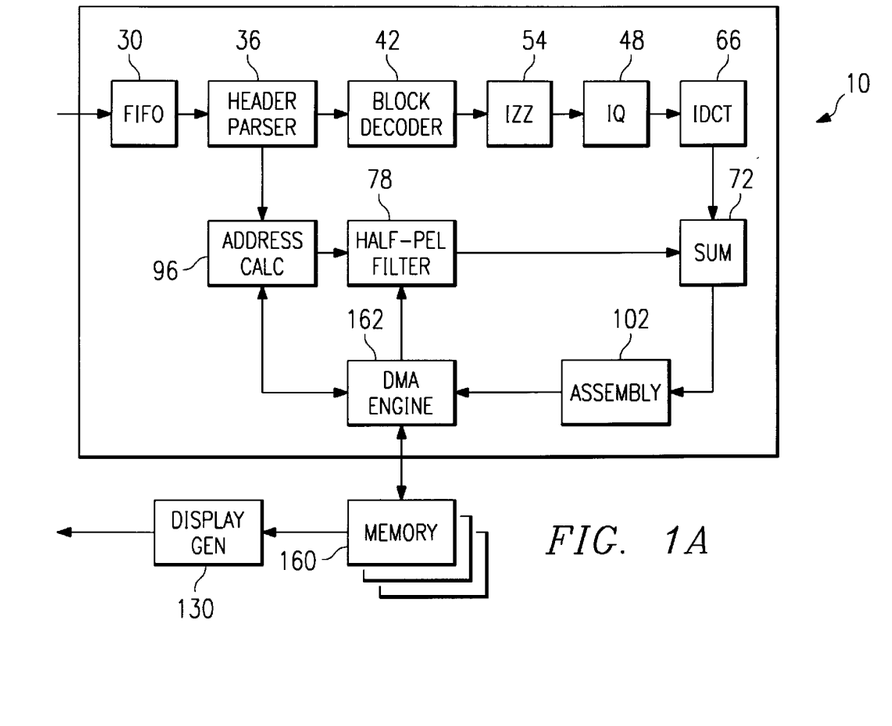
FIG. 1A is an electrical diagrams, in block form, of the architecture of a typical decoder.

FIG. 1A shows a block diagram of the architecture of a typical decoder, such as an MPEG-2 decoder 10. The decoder 10 can be both a video and audio decoder or just a video decoder, where the audio portion of the decoder 10 can be performed in any known conventional way. The encoded bitstream is received by an input buffer, typically a first-in-first-out (FIFO) buffer 30, hereinafter FIFO 30, although the buffer can be any type of memory. The FIFO 30 buffers the incoming encoded bitstream as previously received data is being decoded.

The encoded bitstream for video contains compressed frames. A frame is a data structure representing the encoded data for one displayable image in the video sequence. This data structure consists of one two-dimensional array of luminance pixels, and two two-dimensional arrays of chrominance samples, i.e., color difference samples. The color difference samples are typically sampled at half the sampling rate of the luminance samples in both vertical and horizontal directions, producing a sampling mode of 4:2:0 (luminance:chrominance:chrominance). Although, the color difference can also be sampled at other frequencies, for example one-half the sampling rate of the luminance in the vertical direction and the same sampling rate as the luminance in the horizontal direction, producing a sampling mode of 4:2:2.

A frame is typically further subdivided into smaller subunits, such as macroblocks. A macroblock is a data structure having a 16×16 array of luminance samples and two 8×8 array of adjacent chrominance samples. The macroblock contains a header portion having motion compensation information and 4 block data structures. A block is the basic unit for DCT-based transform coding and is a data structure encoding an 8×8 sub array of pixels. A macroblock represents four luminance blocks and two chrominance blocks.

Both MPEG-1 and MPEG-2 support multiple types of coded frames: Intra (I) frames, Forward Predicted (P) frames, and Bidirectionally Predicted (B) frames. I frames contain only intrapicture coding. P and B frames may contain both intrapicture and interpicture coding. I and P frames are used as reference frames for interpicture coding.

In interpicture coding, the redundancy between two frames is eliminated as much as possible and the residual differences, i.e. interpicture prediction errors, between the two frames are transmitted, the frame being decoded and a prediction frame. Motion vectors are also transmitted in interpicture coding that uses motion compensation. The motion vectors describe how far, and in what direction the macroblock has moved compared to the prediction macroblock. Interpicture coding requires the decoder 10 to have access to the previous and/or future images, i.e. the I and/or P frames, that contain information needed to decode or encode the current image. These previous and/or future images need to be stored and then used to decode the current image.

Intrapicture coding for I frames involves the reduction of redundancy between the original pixels in the frame using block-based DCT techniques, although other coding techniques can be used. For P and B frames, intrapicture coding involves using the same DCT-based techniques to remove redundancy between the interpicture prediction error pixels.

Referring again to FIG. 1A the output of the FIFO 30 is coupled to a macroblock header parser 36. The header parser 36 parses the information into macroblocks, and then parses the macroblocks and sends the header portion of each macroblock to an address calculation circuit 96. The address calculation circuit 96 determines the type of prediction to be performed to determine which prediction frames a motion compensation engine will need to access. Using the motion vector information, the address calculation circuit 96 also determines the address in memory 160 where the prediction frame, and the prediction macroblock within the frame, that is needed to decode the motion compensated prediction for the given macroblock to be decoded is located.

The prediction macroblock is obtained from memory 160 and input into the half-pel filter 78, which is coupled to the address calculation circuit 96. Typically there is a DMA engine 162 in the decoder that controls all of the interfaces with the memory 180. The half-pel filter 78 performs vertical and horizontal half-pixel interpolation on the fetched prediction macroblock as dictated by the motion vectors. This obtains prediction macroblocks.

Figure 1B:
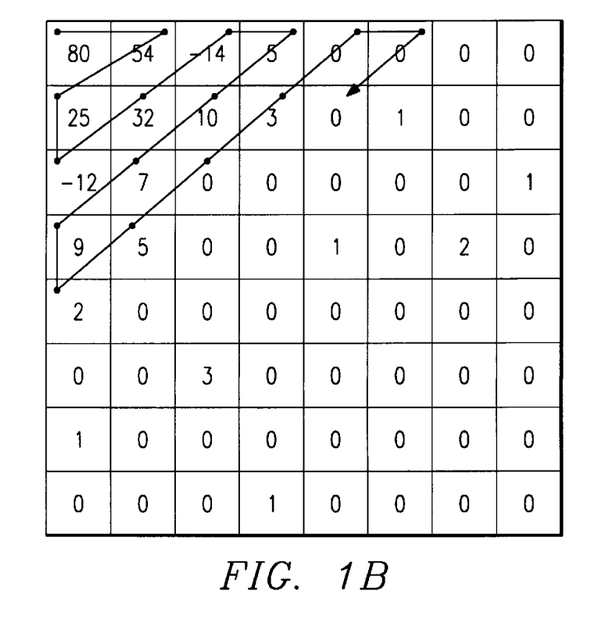
FIG. 1B is an example of a zig-zag scan.

As explained earlier, pixel blocks in I frames and prediction error pixels blocks in P or B frames are encoded using DCT-based techniques. In this approach, the pixels are transformed using the DCT into DCT coefficients. These coefficients are then quantized in accordance with quantization tables. The quantized DCT coefficients are then further encoded as variable length Huffman codes to maximize efficiency, with the most frequently repeated values given the smallest codes and increasing the length of the codes as the frequency of the values decreases. Although codes other than the Huffman codes can be used depending on the decompression protocol. The coefficients are ordered in a rectangular array format, with the largest value in the top left of the array and typically decreasing in value to the right and bottom of the array. To produce a serial data bitstream the array is re-ordered. The order of the serialization of the coefficients is in a zig-zag format starting in the top right comer of the array, i.e if the array is thought of in a matrix format the order of the elements in zig-zag format is 11, 12, 21, 31, 22, 13, 14, etc., as shown in FIG. 1B. The quantization can be performed either before or after the zig-zag scan.

Still referring to FIG. 1A, the header parser 36 sends the encoded block data structures to a block decoder 42. The block decoder 42 decodes variable length codes representing the encoded blocks and converts them into fixed length pulse code modulation (PCM) codes. These codes represent the DCT coefficients of the encoded blocks. The PCM codes are a serial representation of the 8×8 block array obtained in a zig-zag format. The inverse zig-zag scanner 54, connected to the block decoder 42, converts the serial representation of the 8×8 block array obtained in a zig-zag format to a rectangular 8×8 block array, which is passed to the inverse quantizer 48. The inverse quantizer 48 performs the inverse quantization based on the appropriate quantization tables and the passes that to the IDCT circuit 66. The IDCT circuit 66 performs the inverse DCT on its input block and produces the decompressed 8×8 block. The inventors have found that these circuits can be broken down into functional blocks.

The prediction macroblock and the interpicture prediction errors are summed in the summing circuit 72 and passed to the assembly unit 102. Because some frames in interpicture compression require access to future frames to be decoded, the required frames should be sent before the frame that requires them. In the MPEG-2 standard frames can require both past and future frames for decompression, and the compressed frames are not sent in the same order that they are displayed in the video sequence. The assembly unit 102 ensures that the information is placed in the correct place in memory to correspond to the frame being decompressed. The resulting decoded macroblock now needs to be stored in the memory 160 in the place designated for it by the assembly unit 102. All frames need to be stored in memory 160 because the decoded macroblock may not be the next macroblock that is to be sent to the display due to the storing and transmission format of the decompression protocol. In MPEG-2 and other decompression protocols that use interpicture compression, the frames are encoded based on past and future frames. Therefore, in order to decode the frames properly, the frames are not sent in order and need to be stored until they are to be displayed.

The memory requirements of the decoder 10 for a Phase Alternation Line (PAL) and National Television Standards Committee (NTSC) application, capable of supporting 16 Mbits PAL video signals, are typically broken down to the audio and MPEG-2 video requirements. When the audio is MPEG-1, the audio decoder requires 131,072 bits of memory. The MPEG-2 video memory 160 can be logically configured into buffers as follows:

A "Bit buffer," which is a buffer for compressed data that the MPEG-2 standard fixes at 1.75 Mbits plus an extra amount, for example 835,584 bits, for a non-ideal decompression process;

An I frame buffer for a decompressed I-frame in a 4:2:0 format;

A P frame buffer for a decompressed P-frame in a 4:2:0 format;

A B frame buffer for a decompressed B-frame in a 4:2:0 format. The B frame buffer can be optimized to require a reduced amount of memory, that is 0.7407 or 0.6111 of an I frame respectively for PAL or NTSC system.

According to the present MPEG-2 standard technique, and regardless of which frame, i.e. I, P, or B, is concerned, each frame buffer may occupy an amount of memory given by the following table:

| standard PAL | 720 × 576 × 8 bits for the luma | = 4,976,640 bits |
|---|---|---|
| | 360 × 288 × 8 bits for the U chroma | |
| | 360 × 288 × 8 bits for the V chroma | |
| standard NTSC | 720 × 480 × 8 bits for the luma | = 4,147,200 bits |
| | 360 × 240 × 8 bits for the U chroma | |
| | 360 × 240 × 8 bits for the V chroma | |

Taking a PAL system, which represents the most burdensome case, as a reference example, the total amount of memory required is given by:

1,835,008+835,584+4,976,640+4,976,640+(4,976,640*0.7407)=16,310,070 bits.

This calculation takes into account a 0.7407 optimization of the B-picture frame buffer.

Therefore a typical MPEG-2 decoder 10 requires 16 Mbits of memory to operate in the main profile at main level mode (MP at ML). This means that the decoder requires a 2 Mbyte memory 160. Memory 160 is dedicated to the MPEG decoder 10 and increases the price of the decoder 10. In current technology the cost of this additional dedicated memory 160 can be a significant percentage of the cost of the decoder.

Additionally, the decoder 10 should be able to access the memory 160 quickly enough to be able to operate in real time. This means than the decoder 10 should decode images fast enough so that any delay in decoding cannot be detected by a human viewer. A goal is to have the decoder 10 operate in real time without dropping so many frames that it becomes noticeable to the human viewer of the movie. If the decoder 10 does not operate in real time the decoded movie would stop and wait periodically between images until the decoder 10 can get access to the memory to process the next image.

When the memory 160 used for data storage is on a separate chip than the decoder 10, the two chips must be electrically coupled. The input/output pins of the decoder 10 are coupled to the input/output pins of the memory 160 by external metal connections. This increases the amount of time it takes for the decoder 10 to read data out of the memory 160 and write data into the memory 160.

SUMMARY OF THE INVENTION

The present invention provides a method of reducing memory required for decompression of a compressed frame by storing frames in a compressed format using DCT-based techniques. The decoder includes a decoder module coupled to a DCT encoder module. The DCT encoder module has an output coupled to a memory. The stored DCT decoder module has an input coupled to the memory, and two outputs, coupled to the decoder module and the other coupled to an output of the decoder.

In operation, the compressed frame is decompressed in the decoder module to obtain a decompressed frame. The decompressed frame is compressed in the DCT encoder module to obtain a recompressed frame. The recompressed frame is then stored in memory. In a DCT-based decoder, preferably this is only performed for frames having interpicture prediction errors. Most of the decoder module and all of the DCT encoder module can be by-passed for frames not having interpicture prediction errors. The recompressed frame is stored in the memory without having been decompressed. The digital representation of a compressed frame encoded using DCT techniques is much smaller than the digital representation of a decompressed frame and needs much less room in memory than the decompressed frame. Because the frames that are used in the decoding of other frames or that are displayed are stored in a compressed format, the decoder requires much less memory.

The reduction in the required memory allows the memory to be smaller and embedded in the decoder.

In another embodiment of the invention, when the decoder is a DCT-based decoder the stored DCT decoder module can be eliminated and the DCT decoder module contained in the decoder module can be used to both decompress the compressed frame and to decompress the frames needed by the motion compensation engine, provided the DCT decoder module operates fast enough to perform both functions satisfactorily.

Another advantage of the present invention is the significant reduction of memory required by a decoder for decompression of images.

A further advantage of the present invention is the significant cost reduction in the cost of the decoder due to the decoder's lower memory requirement.

Another advantage of the present invention is that the memory needed by the decoder to decompress images can be embedded in the decoder reducing the time the decoder takes to access the memory and decreasing overall system cost by eliminating external memory devices.

A further advantage is that the above advantages are achieved without a significant increase in die area of the decoder at current integration levels.

Other advantages and objects of the invention will be apparent to those skilled in the art having reference to the following specification together with the drawings.

DETAILED DESCRIPTION OF THE PREFERRED EMBODIMENT

Figure 2:
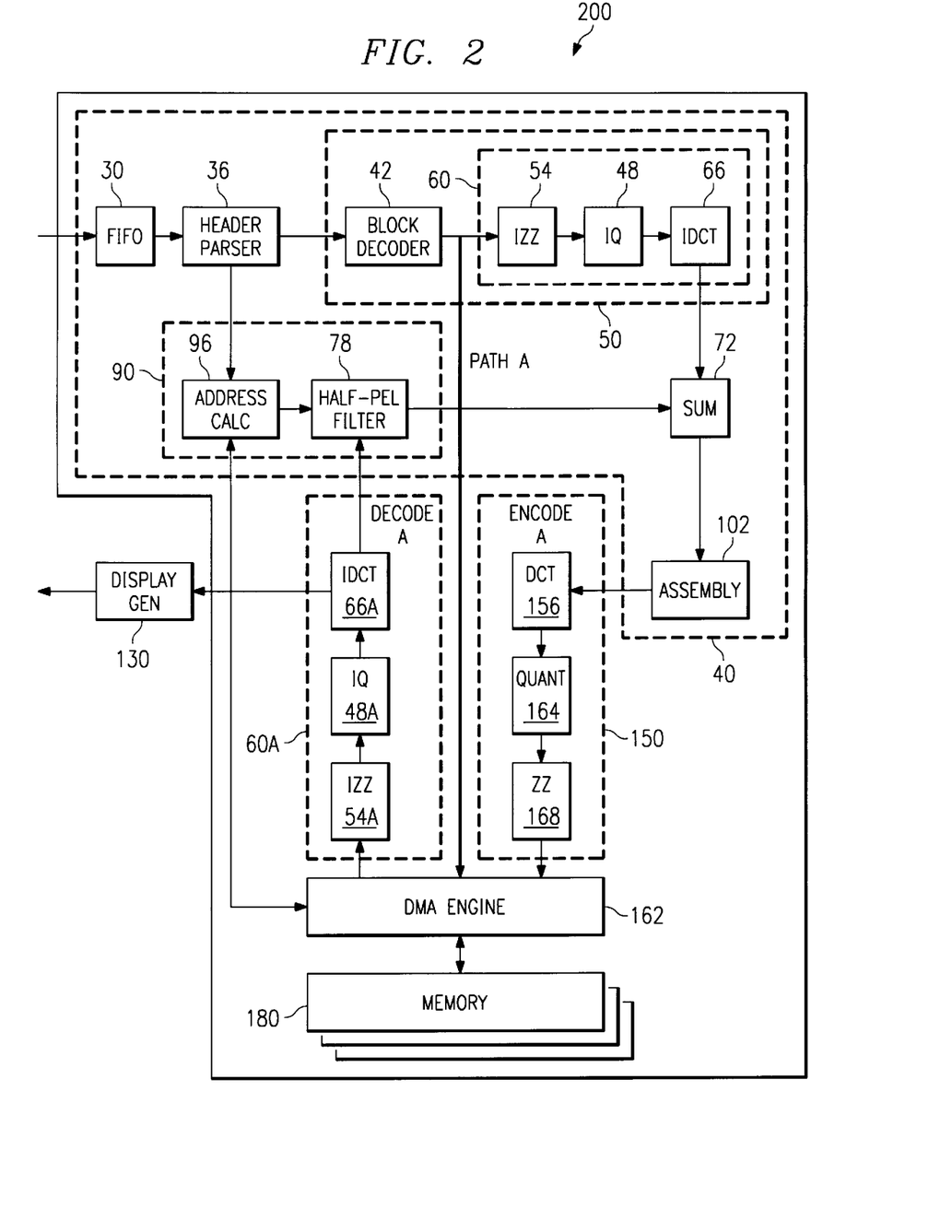
FIG. 2 is an electrical diagram, in block form, of the architecture of a decoder according to an embodiment of the invention.

FIG. 2 shows a block diagram of the architecture of a decoder 200 according to an embodiment of the invention. The decoder 200 can be any decoder which needs to access image frames of a considerable size in order to decompress a compressed frame, such as a MPEG-2 decoder. FIG. 2 specifically shows a decoder 200 that uses the discrete cosine transform (DCT) to decompress frames. Nevertheless, those skilled in the art will appreciate that a decoder that uses different decoding techniques can be used to practice the present invention. Although the invention is most useful for video decoders because of the large size of the video images, the decoder 200 can be a video and audio or just a stand-alone video or audio decoder.

Figure 3:
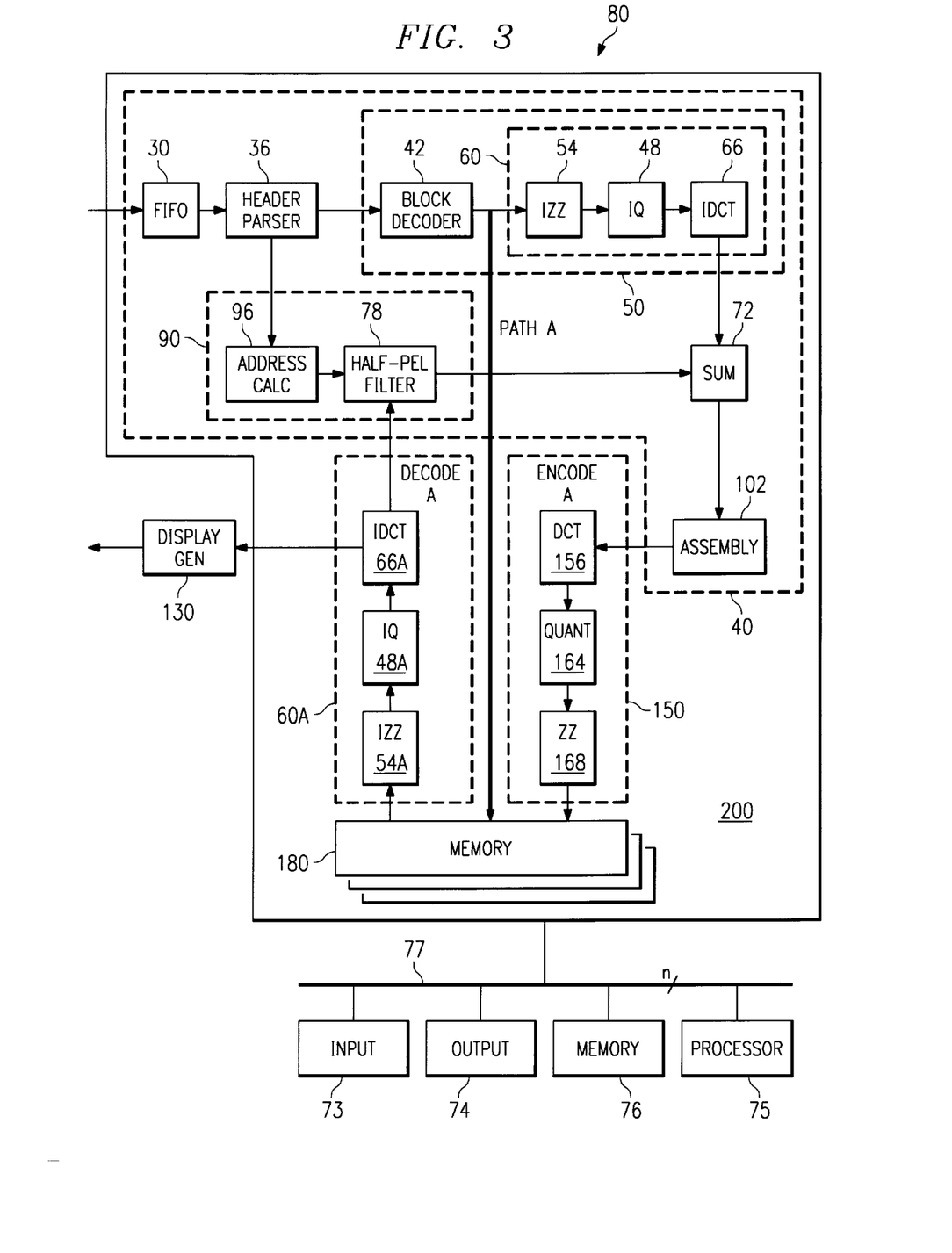
FIG. 3 is an electrical diagram, in block form, of a computer containing a decoder according to an embodiment of the invention.

The decoder 200 contains a decoder module 40, a DCT encoder module 150 and a stored DCT decoder module 60A. The DCT encoder module 150 and stored DCT decoder module 60A can operate in pipeline form. Any parts common to FIGS. 1 through 3 are indicated using the same numbering system. The decoder 200 contains a buffer, a FIFO 30. The FIFO 30 is like the FIFO found in conventional decoders and is used to buffer the incoming compressed data as previously received compressed data is being decoded. In the preferred embodiment the bitstream is encoded to comply to an MPEG-2 format. The FIFO 30 is coupled to the header parser 36. The header parser 36 is like the header parser found in a conventional decoder and serves to parse the encoded data into macroblocks and extract the motion compensation information from the header of the macroblocks.

The first output of the parser 36 is coupled to the block decoder 42 of a block decoder module 50. In a DCT-based decoder 200 the block decoder module 50 contains a first DCT decoder module 60; in a non DCT-based decoder, the decoder module would contain circuits to decode the information based on the non DCT algorithm used. Both the block decoder module 50 and the first DCT decoder module 60 can be structured as a pipeline. The first DCT decoder module includes the inverse zig-zag scanner 54 coupled to the inverse quantizer 48, which is coupled to the IDCT circuit 66. The block decoder module 50 decodes both intrapicture pixels and interpicture prediction errors.

The second output of the parser 36 is coupled to the motion compensation engine 90. The motion compensation pipeline 90 contains an address calculation circuit 96 coupled to the half-pel filter 78. The motion compensation engine 90 fetches the prediction macroblock.

The output of the block decoder pipeline 50 and the motion compensation pipeline 90 is summed in the summing circuit 72. The output of the summing circuit 72 is coupled to the assembly unit 102, and the output of the assembly unit 102 is passed through the DCT encoder module 150, then stored as needed in the memory 180. The memory 180 is coupled to the half-pel filter 78 of the motion compensation pipeline 90 through the DCT decoder module 60A. The output of the assembly unit 102 is the output of the decoder 200. The output of the decoder 200 is coupled to a display generator 130, typically through the memory 180. The decoder can also contain other blocks depending on the electronic system in which the decoder is designed to operate.

The memory 180 is typically a DRAM, however, other types of memory including SRAMs or FIFOs may be used. The memory 180 can be embedded into the decoder 200 or be a separate circuit coupled to the decoder 200. The decision whether to embed the memory in the decoder 200 is based on comparing the advantages of embedding the memory, which include faster access time to the memory 180 and less possibility of faulty connections between the memory 180 and the decoder 200 that can result in erroneous data transmissions, to the additional cost of testing the embedding the memory 180.

In operation, the I or P frames containing the prediction macroblocks needed to decompress the original compressed frame are decompressed in the stored DCT decoder module 60A. The original compressed frame is decompressed in the block decoder module 50 to obtain a decompressed frame. These two steps are preferably performed concurrently. The decompressed frame is summed with any necessary prediction macroblocks in the summer 72, then compressed in the DCT encoder module 150 to obtain a recompressed frame. The recompressed frame is then stored in the memory 180. Preferably this is only performed for P and B frames, I frames can by-pass most of the block decoder module 50 and all of the DCT encoder module 150. The compressed frame can be stored in the memory 180 without having been decompressed and recompressed. When any of the frames, I, P, or B, are to be displayed they are decompressed in the stored DCT decoder module 60A.

The detailed operation of the decoder 200 will now be described. In the present embodiment, a compressed image frame is read into the FIFO 30, although any type of memory can be used as the buffer. The compressed frame is parsed into smaller subunits by the header parser 36. In a different embodiment, the compressed image can be read into the FIFO in units larger than frames and the header parser 36 would parse that, until the image is broken down into macroblocks.

For P and B frames, the header parser 36 also separates the macroblocks into two portions: the header portion, that contains the motion compensation information, and the compressed block data structures. The header portion of the macroblocks are sent to the motion compensation engine 90. The compressed block data structures are sent to the block decoder 42 of the block decoder module 50.

The block decoder module 50 decodes the data pixels and interpicture prediction errors. The block decoder 42 decodes the variable length codes representing the encoded blocks and converts them into fixed length PCM codes, representing the DCT coefficients comprising the encoded blocks, which are a serial representation of the 8×8 block array obtained in a zig-zag format. The inverse zig-zag scanner 54 converts this serial representation to a rectangular 8×8 block array, and the result is passed to the inverse quantizer 48. The inverse quantizer 48 performs the inverse quantization based on the appropriate quantization tables. The inverse zig-zag scanning can be performed either before or after the inverse quantization, and the order of the inverse zig-zag scanner 54 and the inverse quantizer 48 can be reversed with the inverse quantizer 48 coupled to the block decoder 42 and the inverse zig-zag scanner 54 coupled to the IDCT circuit 66. The result is passed to the IDCT circuit 66. The IDCT circuit 66 performs the inverse DCT and produces the decompressed 8×8 block data structure in a rectangular array format.

The motion compensation engine 90 obtains the prediction macroblock. As mentioned above, the motion compensation information is the input of the address calculation circuit 96. The address calculation circuit 96 determines the type of prediction to be performed to determine which frames the motion compensation engine 90 will need to access. The address calculation circuit 96 uses the motion vectors and the type of frame being decoded to determine the address in memory 180 where the prediction frame, and the prediction macroblock, is located. The prediction macroblock is obtained from memory 180 and input into the half-pel filter 72. Typically there is a DMA engine 162 in the decoder that controls all of the interfaces with the memory 180. The half-pel filter 72 performs the horizontal and vertical half pixel interpolation on the prediction macroblocks.

The motion half pixel filtered prediction macroblocks obtained by the motion compensation engine 90, and the interpicture prediction errors, decoded by the block decoder module 50, are summed in the summing circuit 72 and passed to the assembly unit 102. Because in interpicture coding some frames require access to future frames to be decoded the required frames are typically sent by the encoder before the frame that requires them. The MPEG-2 standard uses interpicture prediction, and hence the compressed frames are not sent in the same order that they are displayed in the video sequence. The assembly unit 102 ensures that the information is placed in the correct place in memory to correspond to the frame being decompressed. The assembly is performed by proper address calculation, preferably in software, although it may be performed in a multiplexer.

The resulting decoded macroblock now needs to be stored in the memory 180 in the place designated by the assembly unit 102. All frames need to be stored in memory 180 because the decoded macroblock may not be the next macroblock that is to sent to the display due to the storing and transmission format of the decompression protocol. In MPEG-2 and other decompression protocols that use interpicture coding, the frames are encoded based on past and future frames, therefore in order to decode the frames properly the frames are not sent in order by the encoder and therefore need to be stored until they are to be displayed. Furthermore, I and P frames need to be stored so that they can be used to decode other frames.

The information in these frames, particularly in MPEG-2, is quite large. As explained above, in a PAL system, the memory required to store an I, P and B frame is 16,310,070 bits, taking into account a 0.7407 optimization of the B-picture frame buffer. (There must be enough memory to store all three frames because all three are needed in the most burdensome case of decompressing a B frame.)

The decoded macroblock is recompressed by the DCT encoder module 150 before it is stored in memory 180. The DCT circuit 156 performs the DCT on each decompressed 8×8 block. The quantizer 164 quantizes the values based on the appropriate quantization tables. The zig-zag scanner 168 converts 8×8 block array into a serial representation of it in a zig-zag format to produce each recompressed macroblock, the combination of which is the compressed frame. The zig-zag scanning can be performed either before or after the quantization, and the order of the zig-zag scanner 168 and the quantizer 164 can be reversed with the quantizer 164 coupled to the DMA engine 162 and the zig-zag scanner 168 coupled to the DCT circuit 156. The recompressed macroblocks are then stored in the memory 180.

Recompressing the decompressed frame using DCT-based techniques before it is stored in memory produces the advantage of a significant reduction in the memory needed by the decoder, making the decoder much cheaper. Furthermore, because the memory 180 required is comparatively small and produces the additional advantage of making it possible to embed the memory 180 in the decoder 200 without significantly increasing the cost of testing the memory and decoder.

Embedding the memory 180 into the decoder 200 reduces the amount of time the decoder 200 takes to access the memory 180. Additionally, since the memory 180 now does not require the external input/output pins previously needed for coupling to the decoder 200, the packaging cost of the memory 180 is greatly reduced. Furthermore, the memory 180 can now be specifically configured for the decoder 200 into which it is embedded. Embedding the memory 180 in the decoder 200 also eliminates the need for the external metal connections, increasing the accuracy of the connections in the combined product.

Referring now to FIG. 1A, memory 160 is an external memory. In current technology, embedding a memory requires that the memory be tested through the circuit in which it is embedded, using the input/output pads of the decoder 10 since the memory would not have, or would not have enough of, its own input/output pads. The testing equipment for the decoder is typically more expensive than comparable testing equipment for memories. Both the memory and the decoder must now be tested on the decoder testing equipment, increasing the amount of time each chip is required to spend on the decoder testing equipment by the amount of time it takes to perform the memory tests. Therefore, either:

(1) more expensive testing equipment must be used to test both the decoders and the memories which can now only be tested through the decoders, drastically increasing the cost of each chip; or (2) the cycle time of producing a given number of decoders containing embedded memories will be much larger than for decoders without embedded memories.

Both of these increase the cost of the chip, since each memory cell must be tested. When the memory is small this increase is small. However, when the memory is the size 2 Mbytes required by the typical decoder, as explained above, this increase can be prohibitively expensive.

Referring to FIGS. 1A and 2 simultaneously, the present invention reduces the size of the memory to the point where it is reasonable to embed the memory 180 into the decoder 200, producing the advantages of faster access time to the memory by the decoder, less possibility of faulty connections between the memory and decoder that can result in erroneous data transmissions, an elimination of input/output pads in both the decoder and the memory that were needed for connection to each other, and a reduction in the combined die areas of the decoder and memory due to the reduction in the number of input/output pads.

Referring again to FIG. 2, I frames contain only intrapicture coding. Therefore, there is no motion compensation information in the header of I frame macroblocks and the motion compensation engine 90 can be omitted. In the embodiment shown in FIG. 2, in a DCT-based decoder, such as decoder 200, the I frames do not need to go through the entire block decoder module 50. The I frames are routed from the block decoder 42 to the memory 180 via Path A. Therefore the I frames are also stored in compressed form. The routing can be controlled by software, or a simple multiplexer can be added. When the decoder is not a DCT-based decoder, the I frames would need to go through the entire block decoder module 50, to be recompressed in the DCT encoder module 150, and then stored in the memory 180.

Storing I frames in memory 180 without decompressing them reduces significantly the amount of memory required to store the frame. By-passing the motion compensation engine 90 and most of the block decoder module 50 provides the additional advantage that time to decompress an I-frame is reduced.

DCT transform methods can result in a compression factor of up to 80% for each frame. For 80% compression, the memory requirements for the PAL system for the decoder 200 are given by:

$$1{,}835{,}008 + 835{,}584 + (4{,}976{,}640 * 20\%) +$$
$$(4{,}976{,}640 * 20\%) + ((4{,}976{,}640 * 0.7407) * 20\%) =$$
$$1{,}835{,}008 + 835{,}584 + 99{,}528 + 99{,}528 + 73{,}720.39 = 2{,}943{,}368.39 \text{ bits.}$$

This is a significant reduction in the amount of memory required for decompression. The memory 180 is now of the size that embedding it in the decoder 200 is not impractical. Resulting in a reduction in the die area of the combined device, an increase in the speed with which the decoder 200 can access data in the memory 180, and providing better connections between the decoder 200 and the memory 180.

When a macroblock of the frame is needed by the motion compensation engine 90 for the decompression of another frame, or the frame is to be displayed, the macroblock, or each macroblock of the frame when the entire frame is needed, is decoded by the stored DCT decoder module 60A. The stored DCT decoder module 60A operates in the same manner as the first DCT decoder module 60. The inverse zig-zag scanner 54A converts the serial representation of each block array of the macroblock retrieved from memory to a rectangular 8×8 block array. The result is passed to the inverse quantizer 48A that performs the inverse quantization based on the appropriate quantization tables. The inverse zig-zag scanning can be performed either before or after the inverse quantization, and the order of the inverse zig-zag scanner 54A and the inverse quantizer 48A can be reversed with the inverse quantizer 48A coupled to the DMA engine 162 and the inverse zig-zag scanner 54A coupled to the IDCT circuit 66A. The blocks are passed to the IDCT circuit 66A. The IDCT circuit 66A performs the inverse DCT on the result and produces the decompressed 8×8 block data structure in an array form. The stored DCT decode module 60A has a first output coupled to the motion compensation engine 90 and a second output coupled to the display generator 130.

A goal of this embodiment of the present invention is to have the decoder 200 operate in real time without dropping so many frames that it becomes noticeable to the human viewer of the movie. This means that additional operation of the DCT encoder module 150 and the stored DCT decoder module 60A must be fast enough to process the entire frame in the time between screen refreshes, which is typically 1/30 of a second, with the human viewer not being able to detect any delay in the decoding. In the preferred embodiment the I-frames by-pass the first DCT decoder module 60 and the DCT encoder module 150 and therefore do not require any additional time, while still reducing the required memory significantly.

Transmitting compressed data between the decoder 200 and the memory 180 requires more bandwidth than transmitting uncompressed data. However, compressing the data drastically reduces the amount of memory required. Therefore, weighing the importance and cost of these two factors determines the advantage of the invention for different decompression protocols. For MPEG-2 video the size of the decompressed frame is so large that the advantage of reducing the memory size provides significant advantages in the cost and size of the combination of decoder 200 and memory 180. For other protocols like H.261, where the size of the frames are much smaller than for MPEG-2, the advantage in memory size may not be as significant. In these cases the added blocks, i.e., DCT encoder module 150 and stored DCT decoder module 60A, can be by-passed. One method of bypassing the added block is taught in co-pending U.S. patent application entitled "A Multi-Standard Decoder composed of re-useable discrete modules," by Jefferson E. Owen, Raul Z. Diaz, and Jeyendran Balakrishnan, Ser. No. 08/758,779 (Attorney's Docket No. 95-C-13/15) assigned to SGS-THOMSON Microelectronics, Inc., (hereinafter Ser. No. 08/758,779) incorporated herein by reference. The application teaches separating the decoder 200 into distinct functional blocks that can be accessed individually or in sets. The software controlling which functional blocks to use would need access to the amount of memory available to the decoder, it would also need to calculate the memory requirements of the particular decompression protocol, and then either allow the added blocks to be used or by-passed. This can be used when the decoder 200 complies to just one decompression protocol, or a combination of decompression protocols.

The decoder 200 can decode a bitstream formatted according to any one or a combination of standards. In the preferred embodiment of the invention the decoder 200 is a multi-standard decoder/encoder capable of decoding and encoding sequences formatted to comply to several well accepted standards. This allows the decoder 200 to be able to decode a large number of video and/or audio sequences. The choice of which standards the decoder 200 is capable of decoding bitstreams formatted to and of encoding sequences to comply to is based on the desired cost, efficiency, and application of the decoder 200.

FIG. 3 shows one such application of decoder 200 in a computer 80. Computer 80 has an input device 73, an output device 74, a memory 76, and the decoder, all coupled to a processor 75 through a bus 77. The decoder 200 can also be used in any other system that uses images, such as a digital video disk DVD player, or television system.

An advantage of the invention is that the added blocks, i.e. DCT encoder module 150 and stored DCT decoder module 60A do not require a great deal of additional die space. Using the techniques taught in Ser. No. 08/758,779 to separate the decoder 200 into distinct functional blocks that are accessible separately or in groups this added die space can be reduced even further. The system can be configured to use the DCT encoder module used in an H.261 or H.263 encoder, if one is being used in the system, to be used as the DCT encoder module 150 that recompresses the information before it is stored in memory 180. The DCT encoder module 150 can be used for compression and decompression of information complying to the MPEG-2 and MPEG-1 protocols, but since it is not as advantageous to recompress bitstreams complying to the H.261 and H.263 protocols since they are not as large, it is not needed when decompression bitstreams that comply to the H.261 and H.263 protocols. Therefore the stored DCT encoder module for MPEG-1 and MPEG-2 can be the same DCT encoder module that is used in an H.261 and H.263 encoder.

An MPEG environment is asymmetrical; there are much fewer encoders than decoders. The encoders are difficult and expensive to manufacture and the decoders are comparatively easy and cheap. This encourages many more decoders than encoders, with the encoders in centralized locations, and decoders available such that every end user can have a decoder. Therefore, there are many receivers but few transmitters.

For video telephony and teleconferencing each end user has to be able to both receive and transmit. H.261, and H.263 are currently well-accepted standards for video telephony. An encoder that can encode sequences to comply to the H.261 and H.263 standards is less complicated, having a lower resolution and lower frame rate than an encoder that complies to the MPEG-1 or MPEG-2 standards, possibly making the quality of the resulting decoded images somewhat lower than those from an encoder that complies with the MPEGB-1 or MPEG-2 standards. Such an encoder, since it should be inexpensive and operate in real time, is also less efficient than an encoder to encode sequences to comply to the MPEG-1 or MPEG-2 standards. The compression factor, which is the ratio between the source data rate and the encoded bitstream data rate, of such an encoder is lower for a given image quality than the compression factor of an MPEG encoder. However, because such an encoder is less complicated it is much cheaper and faster than an encoder capable of complying with the MPEG-1 and/or MPEG-2 standards. This makes video telephony possible, since both a long delay in encoding the signal and a cost that is prohibitively expensive for many users is unacceptable in video telephony.

In one embodiment, the decoder 200 is capable of decoding a bitstream formatted to comply to the MPEG-1, MPEG-2, H.261, and H.263 standards, and encoding a sequence to produce a bitstream to comply to the H.261, and H.263 standards. This allows the decoder 200 to be able to be used for video telephony. The encoding to comply to the H.261 and H.263 standards but not the MPEG-1 and MPEG-2 balances the desire to reduce the cost of transmission and storage by encoding to produce the highest compression factor and the desire to keep cost low enough to be able to mass market the device. In this embodiment the H.261 and H.263 DCT encoder module could be reused as the MPEG-1 and MPEG-2 DCT encoder module 150 for recompressing frames before they are stored.

In this embodiment, or any embodiment where the decoder is a DCT-based decoder, the techniques taught in Ser. No. 08/758,779 can be used to separate the decoder 200 into distinct functional blocks capable of being accessed independently. The first DCT decoder module 60 can be used for both the functions of the first DCT decoder module 60 and of the stored DCT decoder module 60A. Therefore, only the DCT encoder module 150 would need to be added. However, the first DCT decoder module 60 would need to be fast enough to process the decoding of the entire frame performing both operations in the time between screen refreshes, which is typically 1/30 of a second, with the human viewer not being able to detect any delay in the decoding.

Referring again to FIG. 2, recompressing the decompressed macroblock, and therefore compressing the original decompressed frame, using DCT-based techniques before it is stored in memory produces a significant reduction in the memory needed by the decoder. This results in a significant cost reduction for the decoder. Additionally, because the memory required is comparatively small it can be embedded in the decoder 200 without significantly increasing the cost of testing the memory and decoder. This produces the advantages of faster access time to the memory by the decoder, less possibility of faulty connections between the memory and decoder that can result in erroneous data transmissions, an elimination of input/output pads in both the decoder and the memory that were needed for connection to each other, and a reduction in the combined die areas of the decoder and memory due to the reduction in the number of input/output pads.

Additionally, in the preferred embodiment the I-frames by pass the first DCT decoder module 60, the DCT encoder module 150 the motion compensation circuit and the summer, and therefore significantly reduce the required memory without adding any additional time for recompressing the frame.

Further background on compression can be found in: International Organization for Standards, INFORMATION TECHNOLOGY—CODING OF MOVING PICTURES AND ASSOCIATED AUDIO FOR DIGITAL STORAGE MEDIA AT UP TO ABOUT 1.5 MBITS/S, Parts 1–6, International Organization for Standards; International Standards Organization, INFORMATION TECHNOLOGY—GENERIC CODING OF MOVING PICTURES AND ASSOCIATED AUDIO INFORMATION, Parts 1–4, International Organization for Standards; Datasheet "STi3500A" Datasheet of SGS-THOMSON Microelectronics; STi3500A—Advanced Information for an MPEG Audio/MPEG-2 Video Integrated Decoder" (June 1995); Watkinson, John, COMPRESSION IN VIDEO AND AUDIO, Focal Press, 1995; Minoli, Daniel, VIDEO DIALTONE TECHNOLOGY, McGraw-Hill, Inc., 1995. Further background on computer architecture can be found in Anderson, Don and Tom Shanley, ISA SYSTEM ARCHITECTURE, 3rd ed., John Swindle ed., MindShare Inc., Addison-Wesley Publishing Co., 1995. All of the above references incorporated herein by reference.

Although the invention has been specifically described with reference to several preferred and alternative embodiments, it will be understood by those skilled in the art having reference to the current specification and drawings that various modifications may be made and further alternatives are possible without departing from the spirit and scope of the invention as set forth in the appended claims.

We claim:

1. A method of reducing memory required for decompression of a compressed original frame in a decoder having access to a memory and having a decoder module, and a discrete cosine transform (DCT) encoder module, comprising:

decompressing the compressed original frame in the decoder module to obtain a decompressed frame;

compressing the decompressed original frame in the DCT encoder into a serial representation in zig-zag format in combination with any necessary prediction frames to obtain a same predictive mode recompressed frame; and storing the recompressed frame in the memory.

2. The method of claim 1, wherein the decoder further includes a stored DCT decoder module, and the decoder module includes a first DCT decoder module, a motion compensation engine, and a summing circuit, and where the method further comprises the step of decompressing any prediction frames needed to decompress the compressed frame in the stored DCT decoder to produce decompressed prediction frames; and wherein the step of decompressing the compressed original frame in the decoder module to obtain a decompressed frame comprises the steps of:

supplying the decompressed prediction frames to the motion compensation engine;

decompressing the compressed original frame in the first DCT decoder module; and summing an output of the first DCT decoder module with an output of the motion compensation engine to obtain the decompressed frame.

3. The method of claim 2, wherein decompressing the compressed original frame in the decoder module and decompressing prediction frames needed to decompress the compressed original frame in the stored DCT decoder module are performed concurrently.

4. The method of claim 1, further comprising responsive to receiving a compressed frame comprising an I frame:

by-passing the steps of:

decompressing the compressed original frame in the decoder module to obtain a decompressed original frame;

compressing the decompressed original frame to obtain a recompressed frame; and storing the recompressed frame in the memory;

storing the compressed original frame in the memory; and decompressing the compressed original frame in the stored DCT decoder module.

5. A decoder coupled to memory comprising:

a decoder module for decoding a compressed frame to obtain a decompressed frame; and a DCT encoder module having a zig-zag scanner for re-encoding the decompressed frame into a serial representation in zig-zag format to obtain a same predictive mode recompressed frame prior to storing in the memory, the DCT encoder module having an input coupled to an output of the decoder module and an output coupled to the memory.

6. The decoder of claim 5, further comprising a stored DCT decoder module for decoding the compressed frame and re-encoded frame, the stored DCT decoder module having an input coupled to the embedded memory and an output coupled to an output of the decoder.

7. The decoder of claim 6, wherein the stored DCT decoder module comprises:

an inverse zig-zag scanner for converting a serial representation of the block data structure into an array representation;

an inverse quantizer for performing an inverse quantization of coefficients of the block data structure; and an inverse discrete cosine transform circuit for performing an inverse discrete cosine transform on the coefficients of the block data structure.

8. The decoder of claim 5, wherein the memory is embedded in the decoder.

9. The decoder of claim 5, wherein the DCT encoder module comprises:

the zig-zag scanner configured to convert an array representation of the block data structure into a serial representation;

a quantizer for performing a quantization of the coefficients of the block data structure; and a discrete cosine transform circuit for performing a discrete cosine transform on the coefficients of the block data structure.

10. The decoder of claim 5, wherein the decoder module comprises:

a parser for parsing the compressed frame and separating motion compensation information and block data structures in the compressed frame, the parser having a first and second output;

a block decoder module for decoding pixels and interpicture prediction errors in the block data structures, the block decoder module having an input coupled to the first output of the parser;

a motion compensation engine for obtaining a prediction macroblock using the motion compensation information, the motion compensation engine having an input coupled to the second output of the parser; and a summing circuit for summing the decoded interpicture prediction errors and the prediction macroblock, the summing circuit having a first input coupled to an output of the decoder module and a second input coupled to an output of the motion compensation engine.

11. The decoder of claim 10, wherein the block decoder module comprises:

a block decoder for decoding DCT coefficients of the block data structures, the block decoder having an input coupled to the input of the decoder module; and a first DCT decoder module for calculating a block data structures from the DCT coefficients, the first DCT decoder module having an input coupled to the block decoder and an output coupled to the output of the decoder module.

12. The decoder of claim 11, wherein the first DCT decoder module comprises:

an inverse zig-zag scanner for converting a serial representation of the block data structure into an array representation;

an inverse quantizer for performing an inverse quantization of coefficients of the block data structure; and an inverse discrete cosine transform circuit for performing an inverse discrete cosine transform on the coefficients of the block data structure.

13. The detector of claim 10, wherein the motion compensation engine comprises:

an address calculation circuit for determining the type of prediction to be performed and the address in the memory of any prediction frames and any prediction macroblocks to decompress the compressed frame; and a half-pel filter for performing a horizontal and vertical half pixel filtering of the prediction macroblock.

14. A DCT decoder for decoding a compressed frame that holds motion compensation information and block data structures, the DCT decoder coupled to an embedded memory comprising:

a parser, for parsing the compressed frame and separating the motion compensation information and the block data structures in the compressed frame, the parser having a first and second output;

a block decoder module for decoding pixels and interpicture prediction errors in the block data structures, the block decoder module having an input coupled to the first output of the parser, a first DCT decode module coupled between the input and an output of the decoder module and having an input coupled to the memory, and having a first output coupled to the motion compensation engine and a second output coupled to an output of the decoder;

a motion compensation engine for obtaining a prediction macroblock using the motion compensation information, the motion compensation engine having an input coupled to the second output of the parser;

a summing circuit for summing the prediction macroblock and the interpicture prediction errors, the summing circuit having a first input coupled to an output of the decoder module and a second input coupled to an output of the motion compensation engine; and a DCT encoder module having a zig-zag scanner for converting an array representation of a block data structure into a serial representation, the DCT encoder module configured to re-encode a decompressed frame to obtain a same predictive mode recompressed frame, the DCT encoder having an input coupled to an output of the summing circuit and an output coupled to the memory.

15. The decoder of claim 14, wherein the decoder comprises a video decoder.

16. The decoder of claim 14, wherein the first DCT decoder module comprises:

an inverse zig-zag scanner for converting a serial representation of the block data structure into an array representation;

an inverse quantizer for performing an inverse quantization of coefficients of the block data structure; and an inverse discrete cosine transform circuit for performing an inverse discrete cosine transform on the coefficients of the block data structure.

17. The decoder of claim 14, wherein the DCT encode module further comprises:

a quantizer for performing a quantization of the coefficients of the block data structure; and a discrete cosine transform circuit for performing a discrete cosine transform on the coefficients of the block data structure.

18. The decoder of claim 14, wherein the motion compensation engine comprises:

an address calculation circuit for determining the type of prediction to be performed and the address in the memory of any prediction frames and any prediction macroblocks to decompress the compressed frame; and a half-pel filter for performing a horizontal and vertical half pixel filtering of the prediction macroblock.

19. An electronic system comprising:

a decoder having:

an embedded memory;

a decoder module for decoding a compressed frame to obtain a decompressed frame; and a DCT encoder module having a zig-zag scanner for re-encoding the decompressed frame to obtain a same predictive mode recompressed frame prior to storing in the embedded memory, the DCT encoder module having an input coupled to an output of the decoder module and an output coupled to the embedded memory.

20. The electronic system of claim 19, further comprising a stored DCT decoder module for decoding the compressed frame and re-encoded frame, having an input coupled to the embedded memory.

21. The electronic system of claim 20, wherein the decoder module comprises:

a parser for parsing the compressed frame and separating motion compensation information and blocked at a structures in the compressed frame, the parser having a first output coupled to the stored DCT decoder module and a second output;

a block decoder module for decoding pixels and interpicture prediction errors in the block data structures, the block decoder module having an input coupled to the first output of the parser;

a motion compensation engine for obtaining a prediction macroblock using the motion compensation information, the motion compensation engine having a first input coupled to the second output of the parser and a second input coupled to the stored DCT decoder module; and a summing circuit for summing the decoded interpicture prediction errors and the prediction macroblock, the summing circuit having a first input coupled to an output of the decoder module and a second input coupled to an output of the motion compensation engine.

22. The electronic system of claim 20, wherein the stored DCT decoder module comprises:

an inverse zig-zag scanner for converting a serial representation of the block data structure into an array representation;

an inverse quantizer for performing an inverse quantization of coefficients of the block data structure; and an inverse discrete cosine transform circuit for performing an inverse discrete cosine transform on the coefficients of the block data structure.

23. The electronic system of claim 19, wherein the decoder comprises a video decoder.

24. The electronic system of claim 19, wherein the DCT encoder module comprises:

the zig-zag scanner configured to convert an array representation of the block data structure into a serial representation;

a quantizer for performing a quantization of the coefficients of the block data structure; and a discrete cosine transform circuit for performing a discrete cosine transform on the coefficients of the block data structure.

25. The electronic system of claim 19, wherein the decoder module comprises:

a parser for parsing the compressed frame and separating motion compensation information and block data structures in the compressed frame, the parser having a first and second output;

a block decoder module for decoding pixels and interpicture prediction errors in the block data structures, the block decoder module having an input coupled to the first output of the parser;

a motion compensation engine for obtaining a prediction macroblock using the motion compensation information, the motion compensation engine having an input coupled to the second output of the parser; and a summing circuit for summing the decoded interpicture prediction errors and the prediction macroblock, the summing circuit having a first input coupled to an output of the decoder module and a second input coupled to an output of the motion compensation engine.

26. The electronic system of claim 25, wherein the block decoder module comprises:

a block decoder having an input coupled to the input of the decoder module; and a first DCT decoder module having an input coupled to the block decoder and an output coupled to the output of the decoder module.

27. The electronic system of claim 26, wherein the first DCT decoder module comprises:

an inverse zig-zag scanner for converting a serial representation of the block data structure into an array representation;

an inverse quantizer for performing an inverse quantization of coefficients of the block data structure; and an inverse discrete cosine transform circuit for performing an inverse discrete cosine transform on the coefficients of the block data structure.

28. The electronic system of claim 25, wherein the motion compensation engine comprises:

an address calculation circuit for determining the type of prediction to be performed and the address in the memory of any prediction frames and any prediction macroblocks to decompress the compressed frame; and a half-pel filter for performing a horizontal and vertical half pixel filtering of the prediction macroblock.

29. The electronic system of claim 19, wherein the electronic system comprises a computer.

30. The electronic system of claim 19, wherein the electronic system comprises a digital video disk player.

* * * * *